United States Patent [19]

Kosugi et al.

[11] Patent Number: 5,229,756
[45] Date of Patent: Jul. 20, 1993

[54] IMAGE CONTROL APPARATUS

[75] Inventors: Naohiro Kosugi; Katsuji Yoshimura; Youji Semba, all of Hamamatsu, Japan

[73] Assignee: Yamaha Corporation, Hamamatsu, Japan

[21] Appl. No.: 885,051

[22] Filed: May 14, 1992

Related U.S. Application Data

[63] Continuation of Ser. No. 474,992, Feb. 6, 1990, abandoned.

[30] Foreign Application Priority Data

Feb. 7, 1989 [JP] Japan ............................... 1-28244

[51] Int. Cl.$^5$ ............................................. G09G 5/00
[52] U.S. Cl. ................................... 340/706; 273/438
[58] Field of Search ............ 340/706, 709; 273/85 G, 273/433, 438, 148 B

[56] References Cited

U.S. PATENT DOCUMENTS

| | | | |
|---|---|---|---|
| 3,510,210 | 5/1970 | Haney | 340/706 |
| 3,792,243 | 2/1974 | Appel et al. | 340/706 |
| 4,540,176 | 9/1985 | Baer | 340/706 |
| 4,768,028 | 8/1988 | Blackie | 340/706 |
| 4,817,950 | 4/1989 | Goo | 273/148 B |
| 4,862,172 | 8/1989 | Ross | 340/709 |
| 4,925,186 | 5/1990 | Braeunig | 340/709 |
| 4,988,981 | 1/1991 | Zimmerman et al. | 340/706 |
| 5,068,645 | 11/1991 | Drumm | 340/709 |

FOREIGN PATENT DOCUMENTS

| | | | |
|---|---|---|---|
| 1245782 | 11/1988 | Canada | 340/709 |
| 0264782 | 10/1987 | European Pat. Off. | |

OTHER PUBLICATIONS

Mattel—Power Glove, 1990/1991 Marketing Support Plans.

Primary Examiner—Jeffery Brier
Attorney, Agent, or Firm—Graham & James

[57] ABSTRACT

An image control apparatus which is essentially composed of a movement detector, a judging device, and a controller wherein the movement detector detects the movement of the operator and generates a movement signal corresponding to the detected movement of the operator. The judgement device determines the state of the operator on the basis of the movement signal provided by the movement detector. The controller controls the image in accordance with the movement signal and the judgement of the judgement device. The movement detector, judging device and the controller cooperate so as to control the image in accordance with the movement of the operator.

10 Claims, 15 Drawing Sheets

OFFENSIVE/DEFENSIVE POINT DISTRIBUTION TABLE

| | OP θ ≥ 90°(extended) | DP θ ≤ 90°(flexed) |
|---|---|---|
| SL 1 | X | X |
| 2 | X | X |
| 3 | 10 | 5 |
| 4 | 15 | 5 |
| 5 | 5 | 10 |
| 6 | 10 | 10 |
| 7 | 100 | X |
| SR 1 | X | X |
| 2 | X | X |
| 3 | 15 | 5 |
| 4 | 30 | 5 |
| 5 | 5 | 10 |
| 6 | 15 | 10 |
| 7 | 100 | X |

TB2

|     |   | 0 ≥ 90  (extended) | 0 ≤ 90  (flexed) |
|-----|---|---------------------|-------------------|
| SL  | 1 | FACE (OFFENCE)      | FACE (DEFENCE)    |
|     | 2 | BODY (OFFENCE)      | BODY (DEFENCE)    |
|     | 3 | LEFT STRAIGHT       | BLOCKING          |
|     | 4 | LEFT UPPER          | BLOCKING          |
|     | 5 | LEFT JAB            | LEFT SWAY         |
|     | 6 | LEFT HOOK           | DUCKING           |
|     | 7 | DEADLY LEFT         |                   |
| SR  | 1 | FACE (OFFENCE)      | FACE (DEFENCE)    |
|     | 2 | BODY (OFFENCE)      | BODY (DEFENCE)    |
|     | 3 | RIGHT STRAIGHT      | BLOCKING          |
|     | 4 | RIGHT UPPER         | BLOCKING          |
|     | 5 | RIGHT JAB           | LEFT SWAY         |
|     | 6 | RIGHT HOOK          | DUCKING           |
|     | 7 | PHANTOM RIGHT       |                   |

OFFENCE/DEFENCE TYPE ALLOCATION TABLE TB1

IMAGE CONTROL APPARATUS

This is a continuation of application Ser. No. 07/474,992 filed on Feb. 6, 1990, now abandoned.

FIELD OF THE INVENTION

The present invention pertains to an image control apparatus, and in particular pertains to an image control apparatus by which means an image may be generated with accurate real time response to the movement of a human operator.

BACKGROUND ART

Image control devices exist which permit the generation of an image in response to the movement of a human operator. Such devices are often employed, for example, as a game apparatus in which a human, animal, or other moving object is presented on a display device as a game opponent, or as an entity to be manipulated in the game.

In order to generate an image in response to movement by the operator, these devices generally employ a joy stick or push buttons, and are thus limited only to control by motion of the operator's fingers and/or wrists. For this reason, these games are relatively difficult to operate, and furthermore, it is difficult to achieve accurate and rapid response by the image to the movements of the human operator.

SUMMARY OF THE INVENTION

With the above described difficulties in mind, it is an object of the present invention to provide an image control apparatus which permits the generation of an image with accurate and rapid response characteristics corresponding to the movement of the human operator.

In order to achieve this object, the present invention provides a movement detection means whereby a signal is generated and output in response to the movement of the human operator. Furthermore, in order to achieve the above object, the present invention provides an image control signal generation means whereby based on the signal output from the above mentioned movement detection means, an image control signal is generated which causes an image to be generated on a display device in response to the above mentioned movement by the human operator. When the operator moves, the above mentioned movement detection means detects the motion, the result of which is received by the image control signal generation means, after which an image control signal is generated in response to the detected motion of the operator. With such a design, it is possible to obtain a moving image which responds accurately and at high speed to the motion of the operator. Further, with the design of the present invention, it is easy for the operator to in turn respond rapidly and accurately to action on the display device. Moreover, due to the fact that the apparatus of the present invention is directly controllable by various parts of the operator's anatomy, the present invention is also applicable to training devices, exercise devices, and the like.

BRIEF DESCRIPTION OF THE DRAWINGS

In the drawings:

FIG. 13 is a table showing the contents of the offensive/defensive type table stored within ROM in the first preferred embodiment of the present invention.

DETAILED DESCRIPTION OF THE PREFERRED EMBODIMENTS OF THE PRESENT INVENTION

In the following section, a first preferred embodiment of the present invention will be described with reference to the drawings. This first preferred embodiment presents the image control device of the present invention as applied to a boxing simulator, the overall electronic layout of which is shown in the block diagram of FIG. 1.

Figure 1:
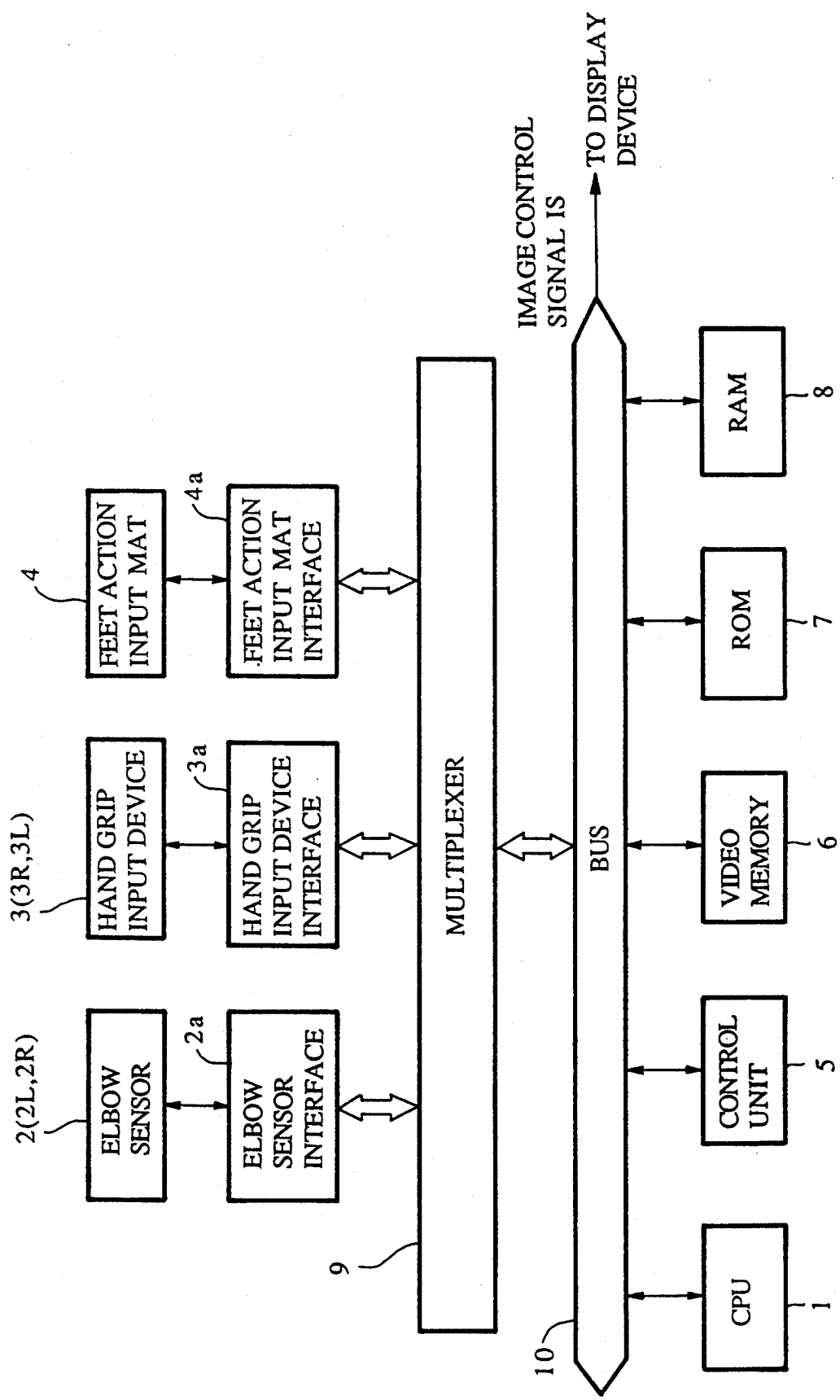
FIG. 1 shows the electronic layout as a whole of the boxing simulator of the first preferred embodiment of the present invention.

First of all, the electronic layout as a whole will be explained. In FIG. 1, CPU (central processing unit) 1 controls each respective section of the boxing simulator apparatus. Left and right elbow sensors 2, hand grip input devices 3, as well as a foot action input mat 4 serve to provide position and movement data for various body parts (elbows, hand and fingers, legs and feet, respectively) which is processed by CPU 1. The elbow sensors 2 consist of a left elbow sensor 2L and a right elbow sensor 2R which are applied to the operator's left and right elbows, respectively. Similarly, the hand grip input devices 3 consist of a left hand grip input device 3L and a right hand grip input device 3R which are gripped in the operator's left and right hands respectively. The operator stands on the foot action input mat 4 during the boxing simulation, whereby data indicating the operator's feet position is continuously generated.

Each elbow sensor 2, hand grip input device 3, as well as foot action input mat 4 are connected with multiplexer 9 via an elbow sensor interface 2a, hand grip input device interface 3a, and a foot action input mat interface 4a, respectively. A control unit 5 has a plurality of push buttons, which are used for designating the commencement and completion of a simulation, for controlling function, and for changing modes, etc. The data related to the video representation of the boxing simulation is stored in video memory 6. ROM (read only memory) 7 contains a control program which includes control routines for directing the operation of CPU 1, and additionally contains various types of boxing data which will be described below. RAM (random access memory) 8 includes a storage area for temporarily holding various types of data, as well as a working area.

In the following section, each respective section of the boxing simulator will be described.

The structure and operation of the elbow sensors 2 will first be described with reference to FIGS. 2 and 3. Because the structures of right elbow sensor 2R and left elbow sensor 2L are symmetric with respect to each other, only the structure of right elbow sensor 2R will be described. Each described element of right elbow sensor 2R having an identification number ending in R has a corresponding element in the left right elbow sensor 2L, with the identification numbers differing only in the appended L or R, identifying left and right components respectively.

Figure 2:
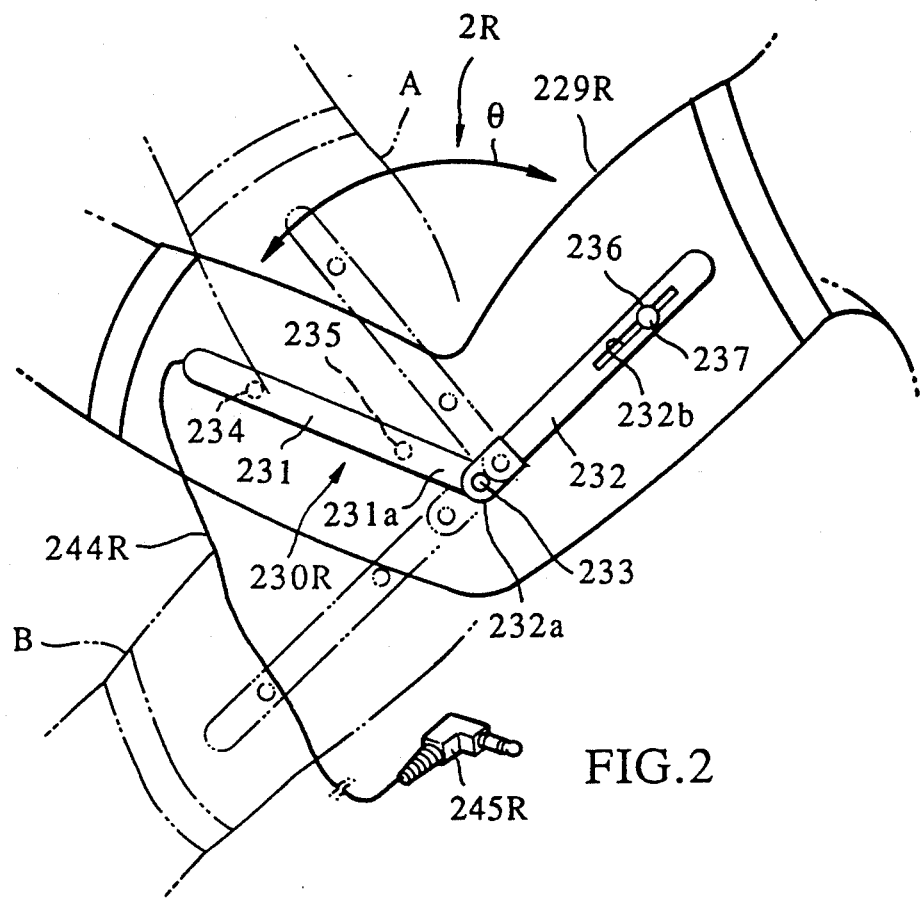
FIG. 2 is a side view showing the structure of an elbow sensor employed in the first preferred embodiment of the present invention.

As shown in FIG. 2, right elbow sensor 2R is comprised of an elastic cuff 229R and an angle detection device 230R. The elastic cuff 229R is applied to the operator's right arm, generally surrounding and extending below and above the elbow articulation, and is constructed of an elastic material, as the so name implies.

The structure of the angle detection device 230R is as follows. As shown in FIGS. 2 and 3, two plates 231, 232 are connected by means of a pin 233 passing through respective end pieces 231a, 232a, so as to be freely pivotable about their connection. The plates 231, 232 are in turn fastened to elastic cuff 229R by means of tabs 234, 235, 236 so as to be freely attachable and removable from the elastic cuff 229R. On the inner surface of plate 231, the male half of tabs 234, 235 are attached, the female counterparts of which are attached to the elastic cuff 229R. An elongated opening 232b is formed in plate 232 parallel to its longitudinal axis, through which movable piece 237 is inserted so as to be freely slidable along the length of elongated opening 232b. On the inner surface of movable piece 237, the male half of tabs 236 is attached, the female counterpart of which is attached to the elastic cuff 229R.

Figure 3:
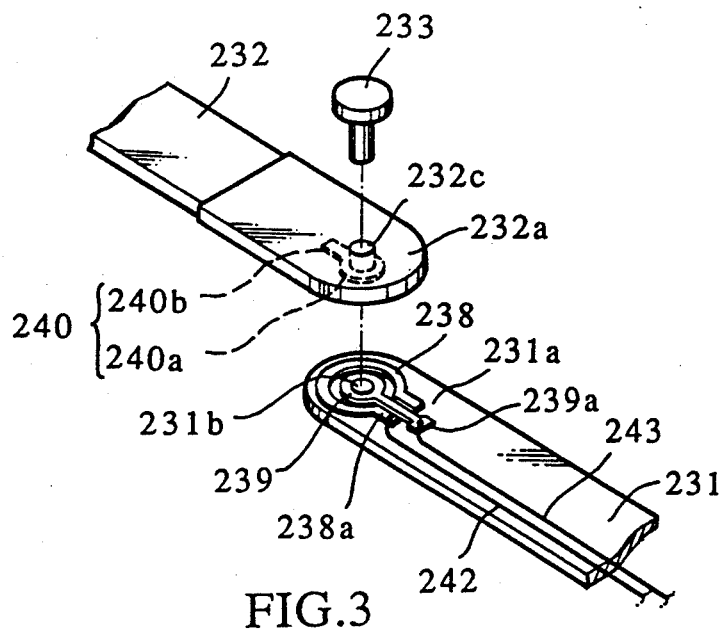
FIG. 3 is an exploded diagram showing a portion of the elbow sensor shown in FIG. 2.

As seen in FIG. 3, between the opposing surfaces of end pieces 231a, 232a of plates 231, 232 are provided a resistance loop 238, a fixed contact 239, and a movable contact point 240 which function together as a potentiometer. Surrounding hole 231b, which is fixed in place by pin 233, is fixed contact 239 provided on end piece 231a. Also provided on end piece 231a is resistance loop 238 in an arc shaped configuration following the circumference of an imaginary circle centered at hole 231b. In end piece 232a of plate 232, hole 232c is formed in which pin 233 is inserted so as to rotate freely. Movable contact 240 is provided about the periphery of hole 232c so as to be in contact with resistance loop 238 and fixed contact 239. The moving contact 240 consists of an annular portion 240a which is always in contact with fixed contact 239, and a protruding portion 240b which moves in concert with the relative motion of plates 231 and 232 with respect to each other, thereby moving in sliding contact along the arc of resistance loop 238. At one end of resistance loop 238 is provided a terminal 238a to which is connected lead wire 242. Similarly, a terminal 239a is provided on a protruding portion of fixed contact 239 to which a lead wire 243 is connected. Via a cable 244R shown in FIG. 2, the lead wires 242, 243 are connected to connector 245R.

Referring to FIG. 2 which shows the right elbow sensor 229R fitted on the right arm of an operator, as the operator's right arm is flexed to move into the position indicated by broken line A, and is extended to move into the position indicated by broken line B, in concert with the movement of the operator's arm, plate 231 rotates pivoting about pin 233. In concert with the above described rotation of plate 231, the protruding portion 240b of moving contact 240 moves along the arc of resistance loop 238. In response to the above described movement of protruding portion 240b relative to resistance loop 238, the resistance between terminal 238a of resistance loop 238 and terminal 239a of fixed contact 239 varies in proportion to the position of moving contact 240, that is, the resistance between terminal 238a of resistance loop 238 and terminal 239a of fixed contact 239 varies in proportion to the angle $\theta$ describing motion of the operator's arm, where $\theta$ equals 180° at the position of full extension and $\theta$ equals 0° at the (hypothetical) position of full flexion of the operator's arm. With the above described motion of the operator's arm, and hence with the movement of plates 231, 232, due to the fact that movable piece 237 is free to move along the length of elongated opening 232b, the motion of the operator's arm is not disturbed.

Figure 4B:
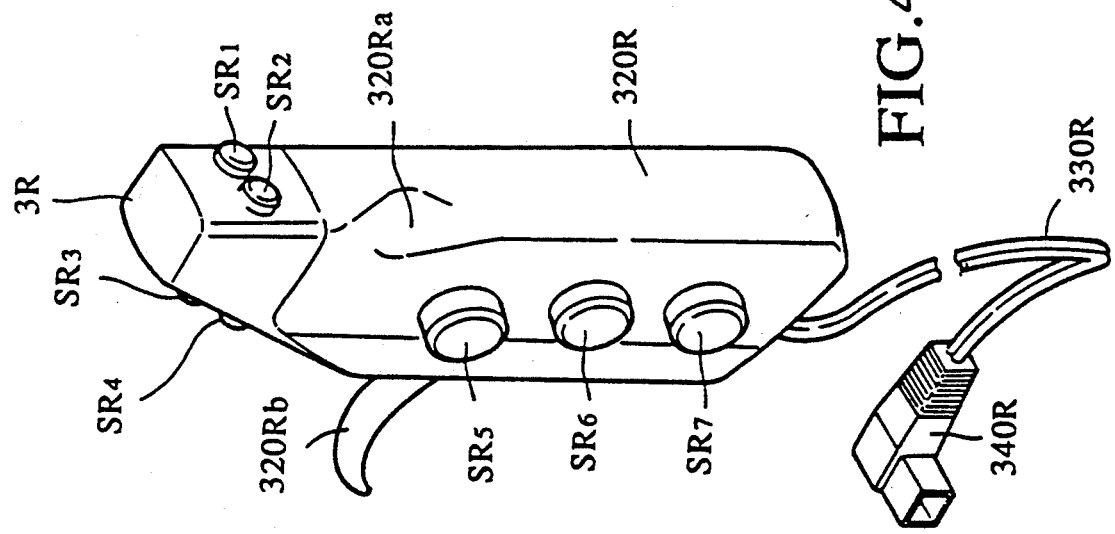
FIG. 4 is an oblique view showing the right and left hand grip input devices employed in the first preferred embodiment of the present invention.
Figure 4A:
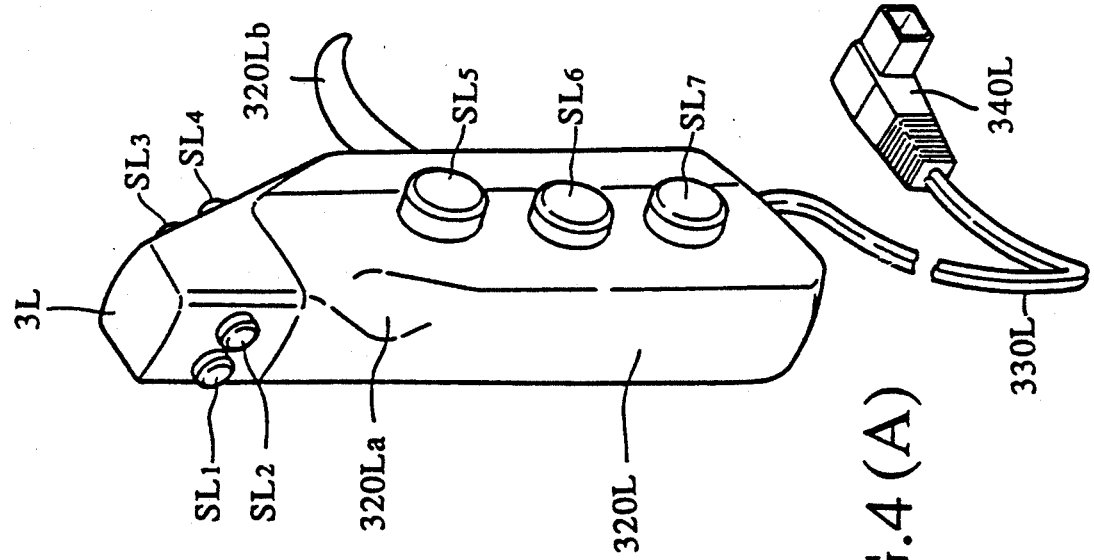

In the following section, the structure and operation of the hand grip input devices 3 will be described with reference to FIG. 4.

As with the elbow sensors 2, because the structures of the right hand grip input device 3R and left hand grip input device 3L are symmetric with respect to each other, only the structure of right elbow sensor 2R will be described. Each described element of right hand grip input device 3R having an identification number ending in R has a corresponding element in the left hand grip input device 3L, with the identification numbers differing only in the appended L or R, identifying left and right components respectively.

For the right hand grip input device 3R, case 320R is formed so as to be easily gripped within the operator's right hand. The case 320R is further formed with a curved surface 320Ra, designed so as fit intimately against the inter-digital space between the thumb and index finger of the grasping hand. Similarly, a stop 320Rb is provided which is grasped between the middle finger and the ring finger, thereby preventing the hand grip input device 3R from slipping out of the operator's hand.

The case 320R has seven pressure sensors SR1-SR7 which are constructed from push buttons and pressure sensitive variable resistance materials, such as piezoelectric elements. By means of the respective push buttons, pressure applied to the buttons by the operator is transmitted to the respective pressure sensitive variable resistance materials, whereby a characteristic resistance value of the pressure sensitive variable resistance material is caused to vary.

At this point, the configuration of the above mentioned pressure sensors SR1-SR7 will be described. The seven push buttons corresponding to pressure sensors SR1-SR7 are positioned so that, when the hand grip input device 3R is gripped in the operator's right hand, using an appropriate finger or thumb among the five available digits, the operator can easily press any of the seven buttons. Pressure sensors SR1, SR2 are placed horizontally aligned in a position readily accessible by the operator's right thumb. Pressure sensors SR3, SR4 are placed vertically aligned so as to be readily accessible by the operator's right index finger. Pressure sensors SR5, SR6, and SR7 are placed vertically aligned so that pressure sensors SR5, SR6, and SR7 may be easily activated by the operator's right middle finger, ring finger, and small finger, respectively. By positioning pressure sensors SR1-SR7 as described above, using the five digits of one hand, the operator can activate any of the seven pressure sensors SR1-SR7 without undue effort or stretching. When a button corresponding to one of the pressure sensors SR1-SR7 is pressed by one of the operator's finger or thumb tips, the pressure force is transmitted to the pressure sensitive variable resistance material within, whereby the intrinsic resistance value of the pressure sensitive material is caused to vary. Each pressure sensor SR1-SR7 connects with connecter 340R via cable 330R.

In the following section, the structure and operation of the foot action input mat 4 will be described with reference to FIGS. 5-7.

The foot action input mat 4 of the present preferred embodiment is composed of a disk shaped mat 4M and eight foot switches FS1-FS8. The mat 4M represents a central foot position, from which the operator carries out foot work. Each of the eight foot switches FS1-FS8 consists of an identically constructed pressure sensor and an identically fan shaped foot stand section. The electronic make up of the pressure sensors of the 8 foot switches FS1-FS8 is for the most part the same as that of the pressure sensors SR1-SR7, and SL1-SL7 of the right and left hand grip input devices 3R and 3L, respectively. The eight foot switches FS1-FS8 are configured as a wheel shaped band surrounding the mat 4M. Each foot switch FS1-FS8 connects with connecter 440 via cable 430.

With the foot action input mat 4 configured as described above, when the operator steps on the foot switch FS1, CPU 1 judges the operator has moved to the right. When foot switch FS2 is stepped on, the operator is judged to have moved to the right rear. When foot switch FS3 is stepped on, the operator is judged to have moved to the rear. When foot switch FS4 is stepped on, the operator is judged to have moved to the left rear. When foot switch FS5 is stepped on, the operator is judged to have moved to the left. When foot switch FS6 is stepped on, the operator is judged to have moved to the left front. When foot switch FS7 is stepped on, the operator is judged to have moved to the front. When foot switch FS8 is stepped on, the operator is judged to have moved to the right front. During a boxing simulation, if the foot action input mat 4 is placed so that foot switch FS1 is to the operator's right as the operator faces the display equipment, the output of the foot action input mat 4 will accurately correspond with the movement of the operator's feet.

Figure 5:
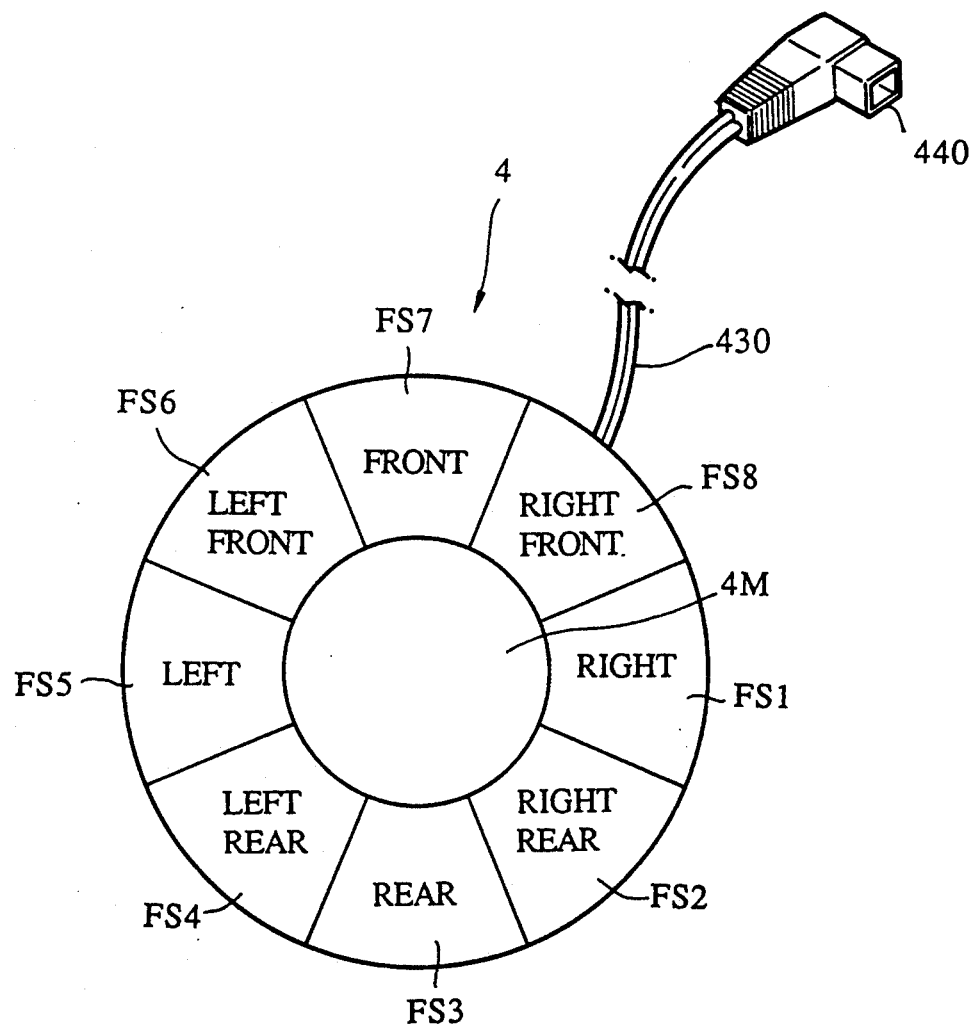
FIG. 5 is an overhead view showing the layout of the foot action input mat of the first preferred embodiment of the present invention.
Figure 6:
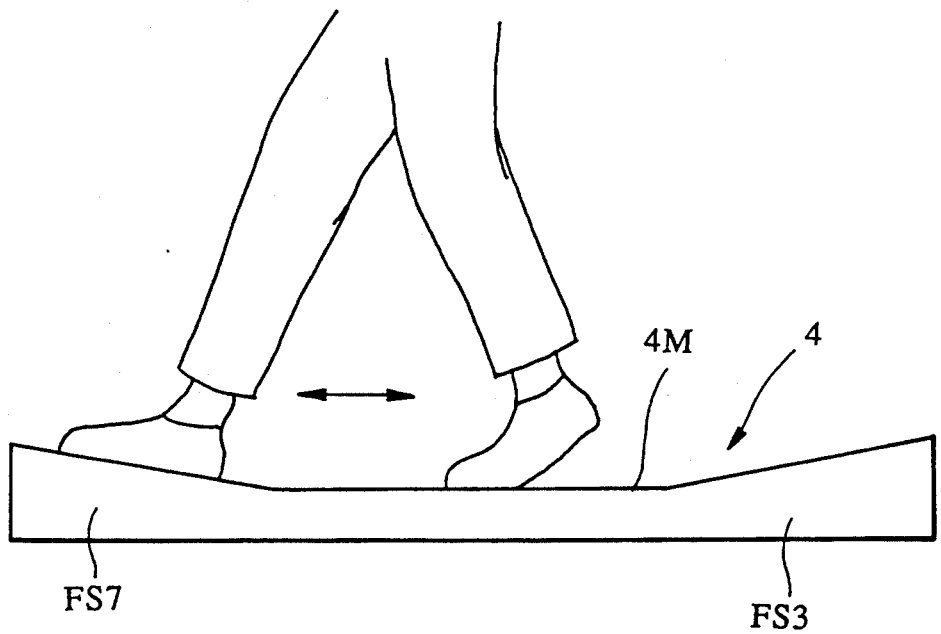
FIG. 6 is a side view showing an example of the foot action input mat shown in FIG. 5 in use.
Figure 7:
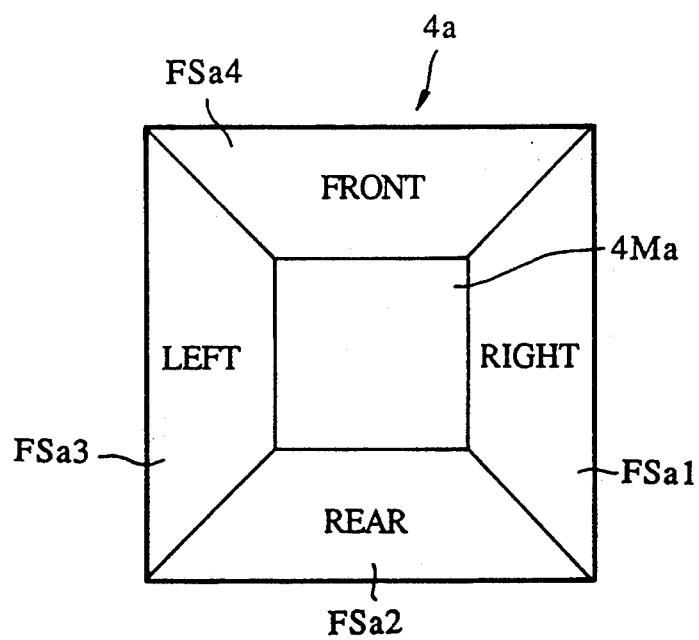
FIG. 7 is an overhead view showing the layout of a variation of the foot action input mat shown in FIG. 5.

FIG. 7 is an overhead view showing the layout of a variation of the foot action input mat of FIG. 5. The foot action input mat shown in FIG. 7 is simplified compared to the foot action input mat shown in FIG. 5. Accordingly, as described below, operation of the foot action input mat shown in FIG. 7 is almost identical to that of the foot action input mat shown in FIG. 5.

In the following section, the structure and operation of elbow sensor interface 2a will be described with reference to FIG. 8.

Figure 8:
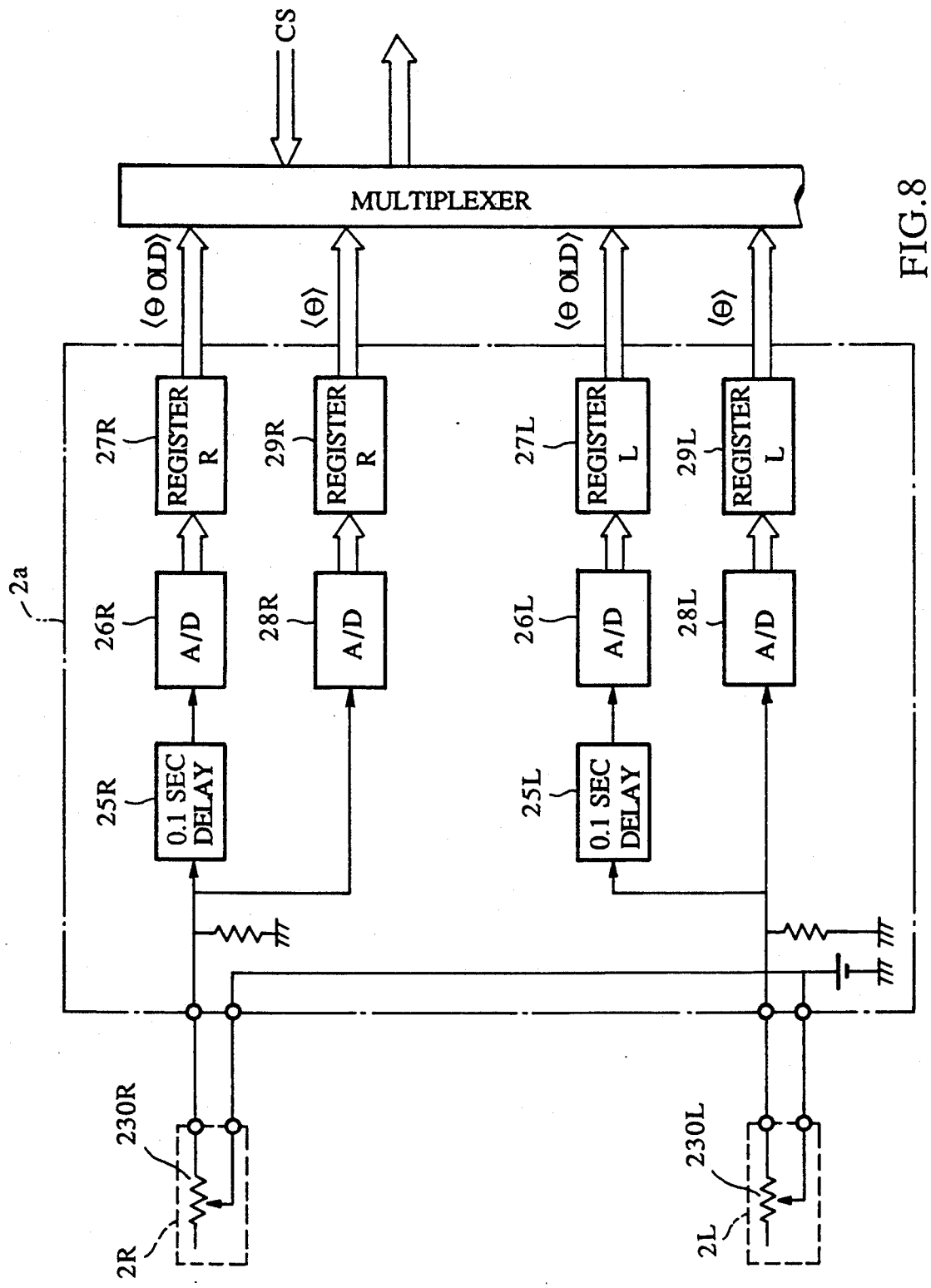
FIG. 8 is a block diagram showing the electronic layout of an elbow sensor interface employed in the first preferred embodiment of the present invention.

Shown in FIG. 8, analog delay circuit 25R causes the signal supplied from angle detection device 230R, corresponding to the amount of flexion or extension of the operator's right elbow given by $\theta$, to be delayed by 0.1 sec., after which the delayed analog signal is then supplied to A/D converter 26R. In A/D converter 26R, the analog signal is converted into a digital signal having a fixed bit number (for example 8 bits), after which it is preserved in register 27R. Additionally, the signal from angle detection device 230R is supplied directly to A/D converter 28R, after which the digitally converted data is preserved in register 29R. As so described, real time digital data corresponding to the degree of bending of the operator's right elbow is temporarily preserved in register 29R, after which it is output as angle data $<\theta>$. Similarly, angle data which is delayed 0.1 sec with respect to the real time angle data is temporarily preserved in register 27R, after which it is output as delayed angle data $<\theta old>$.

For each of the above described elements 25R-29R provided to interface with right elbow sensor 2R, corresponding elements 25L-29L are provided to interface with left elbow sensor 2L.

In the following section, the structure and operation of hand grip input device interface 3a will be described with reference to FIG. 9.

Figure 9:
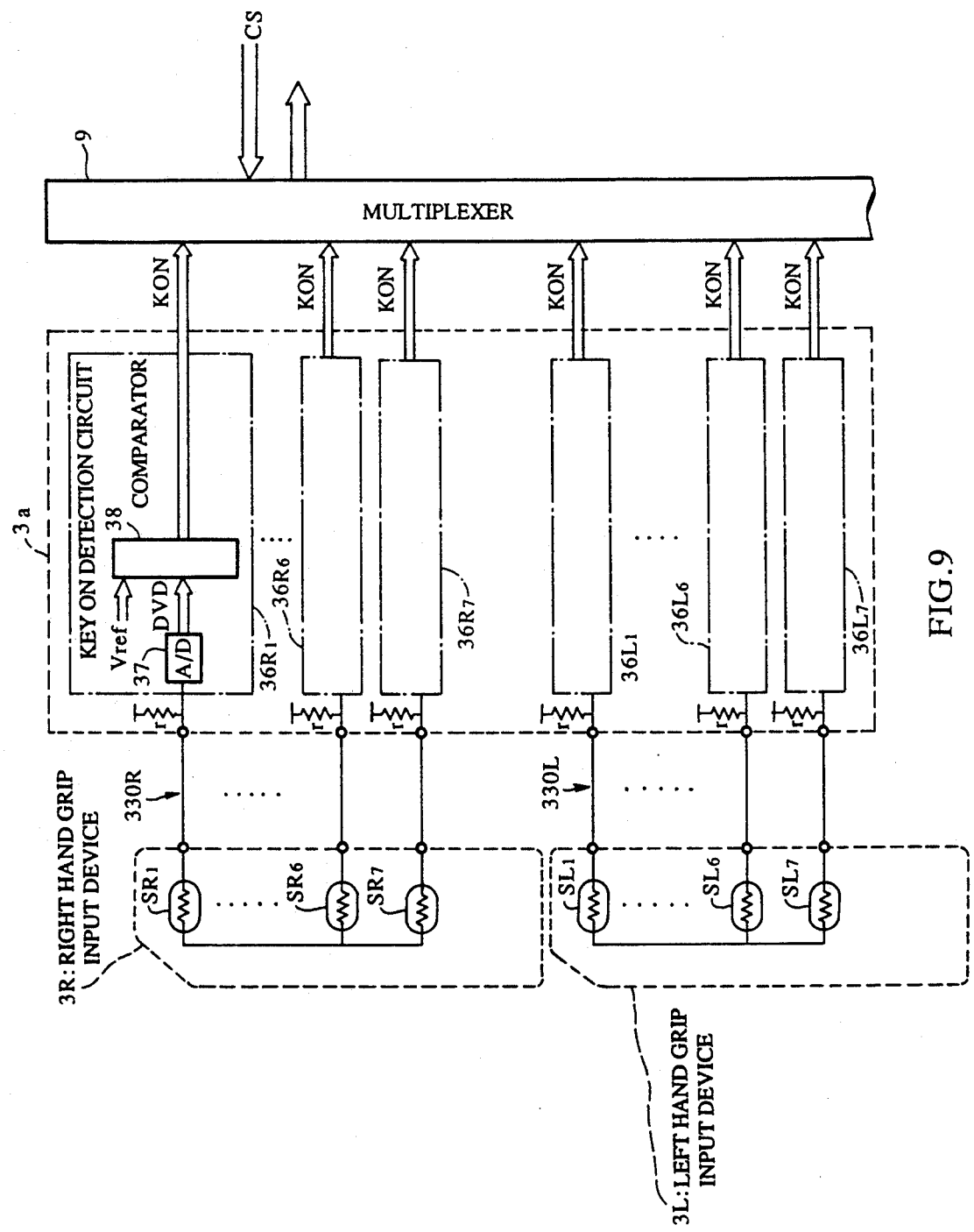
FIG. 9 is a block diagram showing the electronic layout of a hand grip input device interface employed in the first preferred embodiment of the present invention.

As shown in FIG. 9, the terminal of each pressure sensor SR1-SR7 in hand grip input device 3R connects with hand grip input device interface 3a via cable 330R, and the corresponding signals are pulled up by pull-up resistances r while connecting directly with key on detection circuits 36R1 -36R7. Based on the detection voltage supplied from each pressure sensor SR1-SR7, key on signals KON are output from the corresponding key on detection circuits 36R1-36R7. As thus described, when the pressure applied to any of pressure sensors SR1-SR7 in hand grip input device 3R exceeds a certain threshold value, a key on signal KON is output from the corresponding key on detection circuit 36R1-36R7. Each key on detection circuit 36R1-36R7 is composed of an A/D converter 37 and comparator circuit 38. In the A/D converters 37, each detected voltage supplied from the pressure sensors SR1-SR7 is converted to voltage data DVD having a fixed bit number, after which the voltage data DVD is then supplied to the corresponding comparator circuit 38. As thus described, with the pressure applied to the pressure sensitive variable resistance material in each of pressure sensors SR1-SR7 becoming great, the corresponding resistance becomes small, and similarly, the output voltage from each pressure sensor SR1-SR7 supplied to the A/D converters 37 becomes small. Due to this, the value of the digital signal is inverted and output as the voltage data DVD. In the comparator circuits 38, the supplied voltage data DVD value is compared with that of a standard reference voltage $V_{ref}$. When the DVD value is greater than the $V_{ref}$ value, the output of the comparator 38 is set at "H". That is to say, the key on signal KON is output.

With the hand grip input device interface 3a as described above, for each of the key on detection circuits 36R1-36R7 corresponding to pressure sensors SR1-SR7 respectively, there is provided a corresponding key on detection circuit 36L1-36L7 for each of pressure sensors SL1-SL7 which is constructed in an entirely identical fashion.

In the following section, the structure and operation of foot action input mat interface 4a will be described with reference to FIG. 10.

Figure 10:
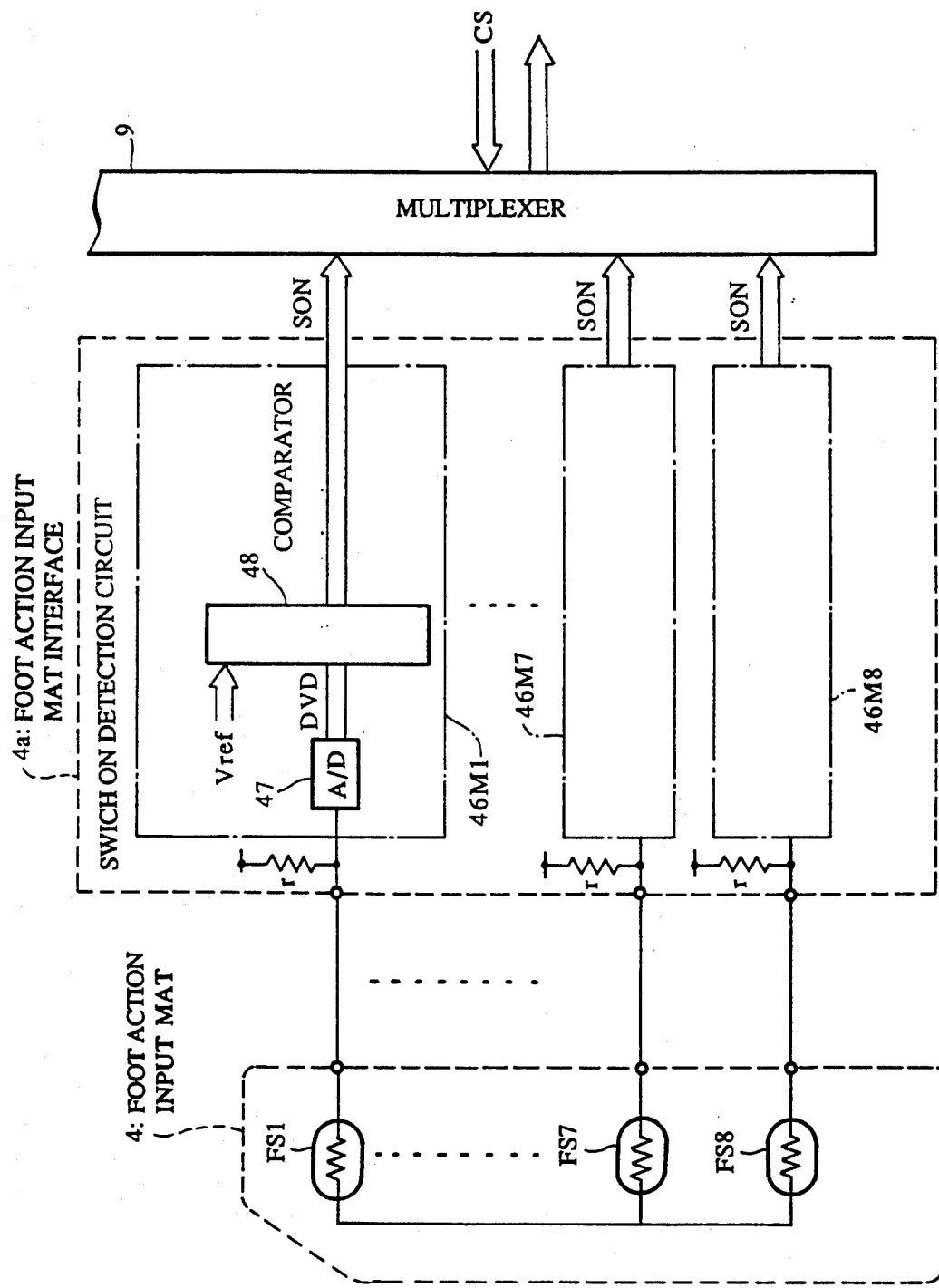
FIG. 10 is a block diagram showing the electronic layout of a foot work input mat interface employed in the first preferred embodiment of the present invention.

As shown in FIG. 10, the terminal of each foot switch FS1-FS8 in the foot action input mat 4 connects with foot action input mat interface 4a via cable 430, and the corresponding signals are pulled up by pull up resistances r while connecting directly with switch on detection circuits 46M1-46M8. Based on the detection voltage supplied from each foot switch FS1-FS8, switch on signals SON are output from the corresponding switch on detection circuits 46M1-46M8. As thus described, when the pressure applied to any of foot switches FS1-FS8 in foot action input mat 4 exceeds a certain threshold value, a switch on signal SON is output from the corresponding switch on detection circuit 46M1-46M8. Each switch on detection circuit 46M1-46M8 is composed of an A/D converter 47 and comparator circuit 48. With the foot action input mat interface 4a as described above, the structure of each switch on detection circuit 46M1 -46M8 is entirely identical to that of key on detection circuits 36R1-36R7. Accordingly their description will be abbreviated to the above.

In the following section, the function and operation of the remainder of the boxing simulator will be described.

For each interface unit as described above (elbow sensor interface 2a, hand grip input device interface 3a, foot action input mat interface 4a), the output data and signals, that is, the delayed angle data $<\theta old>$ output from registers 27R, 27L (FIG. 8), the angle data $<\theta>$ output from registers 29R, 29L (FIG. 8), the key on signals KON output from key on detection circuits 36R1-36R7, 36L1-36L7 (FIG. 9), and the switch on signals SON output from switch on detection circuits 46M1-46M8 (FIG. 10), are supplied to multiplexer 9. Based on a channel selection signal CS from CPU1, multiplexer 9 successively outputs the supplied delayed angle data $<\theta old>$, angle data $<\theta>$, key on signals KON, and switch on signals SON.

As stated previously, various types of boxing data are stored in ROM 7. Such data includes an opponent's data area, image selection data area, as well as the offense/defence type allocation table TB1 (hereafter abbreviated as type table TB1) shown in FIG. 13. Within the opponent's data area referred to above, the power, special ability, weak points, foot work ability, movement characteristics, etc. of the opposing boxer BX (refer to FIG. 17. Hereafter the opposing boxer will be indicated by BX) in the display frame DF fighting with the operator are stored.

By means of the type table TB1, according to the combination of which of the pressure sensors SR1 or SR2 is activated by the operator's right thumb, which of the pressure sensors SR3-SR7 is activated by the operator3 s right fingers, as well as the status of the operator's right elbow detected by right elbow sensor 2R, offensive action and offense types (patterns), as well as defensive action and defense types of the operator's right arm can be indicated. Similarly, by the combination of the operation states of the left hand grip input device 3L and the left elbow sensor 2L, offensive action and offense types (patterns), as well as defensive action and defense types of the operator's left arm can be indicated. Furthermore, as each signal (each key on signal KON, angle data $<\theta>$) in response to the operation states of the left hand grip input device 3L and the left elbow sensor 2L, together with those of the right hand grip input device 3R and the right elbow sensor 2R is received by CPU 1, based on these various signals, the type table TB1 is referred to, by which operation information regarding the operator's offensive/defensive operating state is yielded. That is to say, when the operator's elbow is extended, in other words, when $\theta$ is greater than or equal to 90°, the operator's arm is judged by CPU 1 to be in a offensive posture. When the operator's elbow is flexed, in other words, when $\theta$ is less than 90°, the operator's arm is judged by CPU 1 to be in a defensive posture (refer to FIG. 13).

When pressure sensor SR1 of right hand grip input device 3R is selected from between pressure sensors SR1 or SR2 and is activated by the operator's right thumb (and similarly, when pressure sensor SR1 of left hand grip input device 3L is selected from between pressure sensors SL1 or SL2 and is activated by the operator's left thumb), the offensive/defensive state determined in response to the respective elbow sensor state is judged to be in regard to the opponent's or operator's face, respectively. Similarly, when pressure sensor SR2 of right hand grip input device 3R is selected from between pressure sensors SR1 or SR2 and is activated by the operator's right thumb (and similarly, when pressure sensor SL2 of left hand grip input device 3L is selected from between pressure sensors SR1 or SL2 and is activated by the operator's left thumb), the offensive/defensive state determined in response to the respective elbow sensor state is judged to be in regard to the opponent's or operator's body, respectively (refer to FIG. 13).

In the type table TB1, the offensive types include the upper, straight, hook, jab, deadly left, phantom right, etc. Defensive types include blocking, ducking, sway, etc. The various offensive and defensive types mentioned above are selected through activation of pressure sensors SR3-SR7 and pressure sensors SL3-SL7 by the operator's right and left fingers respectively. For example, when the operator decides to attack the face of the opponent boxer BX with a left upper, as the operator's left elbow extends and reaches a position such that the angle data $<\theta>$ output by register 29L in elbow sensor interface 2a becomes greater or equal to 90°, at the same time the operator is activating pressure sensors SR1 and SL4 of left hand grip input device 3L. In this circumstance, if the angle data $<\theta>$ is not increasing as well, then in reality an attack is not possible. This matter will be described further on below. As CPU 1 receives the signals output from elbow sensor interface 2a and hand grip input device interface 3a in response to the above described offensive operation by the operator, [face] and [left upper] is read out from type table TB1 and it is thereby judged that the operator has initiated a left upper to the face of the opponent boxer BX.

On the other hand, if the operator wishes to carry out a blocking action using the right arm in response to an attack to the operator's face by the opponent boxer BX, as the operator's right elbow is flexed and reaches a position such that the angle data $<\theta>$ output by register 29R in elbow sensor interface 2a becomes less than 90°, at the same time the operator is activating pressure sensors SR1 and SR3 (or SR4) of right hand grip input device 3R. As CPU 1 receives the signals output from elbow sensor interface 2a and hand grip input device interface 3a in response to the above described defensive operation by the operator, [face] and [right blocking] is read out from type table TB1 and it is thereby judged that the operator has assumed a right blocking posture to protect his/her face from the attack of the opponent boxer BX.

Based on the respective outputs of the elbow sensor interface 2a, hand grip input device interface 3a, and foot action input mat interface 4a (angle data $<\theta>$, delayed angle data $<\theta\text{old}>$, key on signal KON, switch on signal SON), the most suitable display is selected from the image selection data area. For example, when CPU 1 judges that the operator wishes to apply a [left upper] against the opponent boxer BX, based on that judgement, CPU 1 reads predetermined image selection data from ROM 7, after which in accordance with the read out image selection data, a display frame DF is read from video memory 6 in which the opponent boxer BX is seen to receive the [left upper] in the face, after which the opponent boxer BX is seen to stagger in response to the blow (refer to FIG. 18). On the other hand, in the case where CPU 1 judges in accordance with the opponent's ability data that the opponent boxer's defensive action (for example, blocking action, sway action, etc.) was momentarily faster than that of the operator, an according display frame DF is read from video memory 6 in which the blocking action, sway action, etc. of the opponent boxer BX is shown (refer to FIG. 17).

Figures 11, 14:
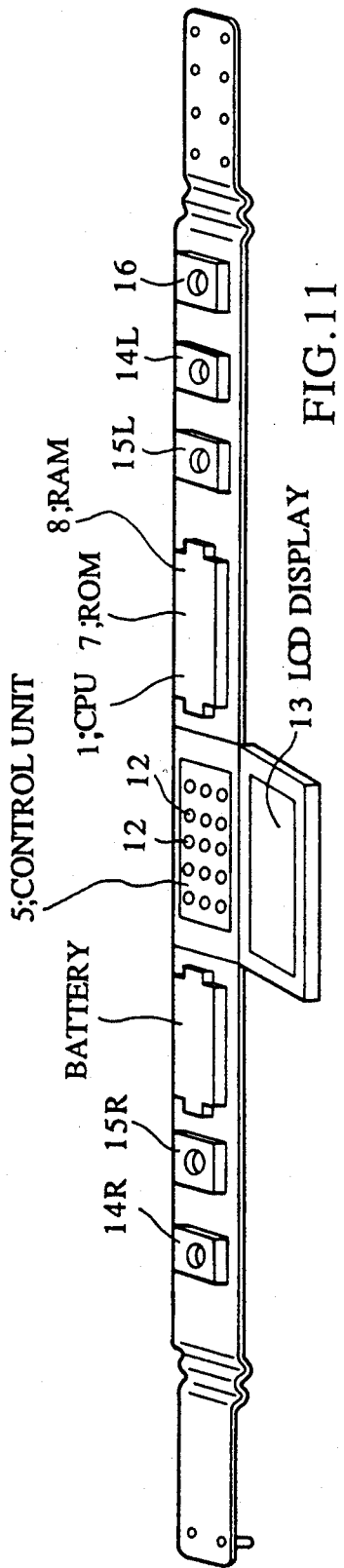
FIG. 11 is an oblique view showing the external appearance of the image control apparatus central unit employed in the first preferred embodiment of the present invention.
FIG. 14 is a table showing the contents of the offensive/defensive value distribution table shown in FIG. 13 as stored in RAM.

As previously explained, RAM 8 includes various types of data areas. For example, there is a point distribution table TB2 (refer to FIG. 14. Hereafter referred to as point table TB2), angle data area, delayed angle data area, operator's feet position area, opponent boxer's feet position data area, distance data area, extended arm length data area, extended arm length table, power data area, etc. As shown in FIG. 14, the point table TB2 is established so as to be able to assign offensive points OP and defensive points DP to the operator, these offensive points OP and defensive points DP being determined on the basis of the various key on signals KON output from hand grip input device interface 3a in response to activation of pressure sensors SR1-SR7, SL1-SL7 of the right and left hand grip input devices 3R, 3L respectively, as well as the angle data $<\theta>$ output from elbow sensor interface 2a in response to the output of the right and left elbow sensors 2R and 2L. The above mentioned offensive points OP are an index of the operator's offensive strength, while the defensive points DP are an index of the operator's defensive strength, in other words, a measure of the operator's ability to fend off the attacks of the opponent boxer BX.

As thus described, in terms of the signals provided to type table TB1 and point table TB2 in order to elicit their respective output data, both type table TB1 and point table TB2 are entirely the same. Due to this fact, when which of the various offense types is being judged to have occurred by CPU 1, at the same time, the corresponding offensive points OP can also be determined. As an example, when the operator is judged to have carried out a [left upper] offensive action, it can be determined that 15 additional offensive points have been accumulated, and similarly, when the operator is judged to have carried out a [deadly left] offensive action, it can be determined that 100 additional offensive points have been accumulated. In the same way, when which of the various defense types is being judged to have occurred by CPU 1, at the same time, the corresponding defensive points DP can also be determined. As an example, when the operator is judged to have carried out a [right blocking] defensive action, it can be determined that 5 additional defensive points have been accumulated, and similarly, when the operator is judged to have carried out a [right ducking] defensive action, it can be determined that 10 additional defensive points have been accumulated.

In the above mentioned angle data area, angle data $<\theta>$ is stored. Similarly, in the delayed angle data area, delayed angle data $<\theta\text{old}>$ is stored. The operator's feet position data area contains real time position data correlating with the operator's feet position in the boxing ring RI (FIG. 18) on the basis of his/her actual feet position on the foot action input mat 4. The opponent boxer's feet position data area contains real time position data $(X_2, Y_2)$ correlating with the opponent boxer's BX feet position in the boxing ring RI. The above mentioned position data $(X_1, Y_1)$, $(X_2, Y_2)$ are Cartesian coordinates representing positions in an imaginary horizontal plane which is shown on the display frame DF as the boxing ring RI.

In the above mentioned distance data area, distance data $(X_2-X_1, Y_2-Y_1)$ indicating the distance between the operator and the opponent boxer BX is maintained. The extended arm length data area holds extended arm length distance data $(LX_1, LY_1)$ (here $LX_1, LY_1$ are both positive values) which are values necessary for calculation of the operators fist position. The extended arm length table is a table of extended arm length distance data $(LX_{2(1)}, LY_{2(1)})$, $(LX_{2(2)}, LY_{2(2)})$, . . . $(LX_{2(n)}, LY_{2(n)})$, for the opponent boxer BX similar to that of the above described extended arm length data area in which each pair of coordinates $(LX_{2(n)}, LY_{2(n)})$ represents extended arm length distance data for one of the many potential opponent boxers BX. The power data area holds power data $PW_1$ for the operator and power data $PW_2$ for the opponent boxer BX.

The various components shown in FIG. 1, CPU 1, control unit 5, video memory 6, ROM 7, RAM 8, etc. are included as component parts of image control apparatus in the central unit 11. As shown in FIG. 11, image control apparatus central unit 11 is in the form of a belt which may be applied to the operator's waist. In FIG. 11, push button switches 12 and LCD (liquid crystal display) 13 are also shown. In the following section, the operation of a boxing simulation employing the above described apparatus will be explained.

Figure 12:
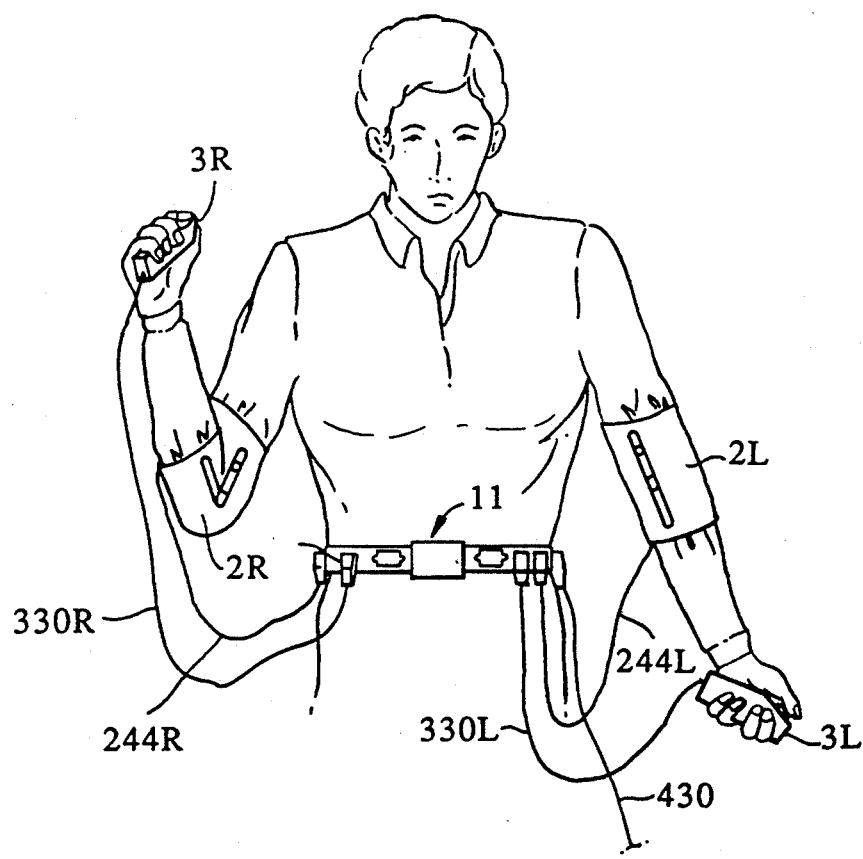
FIG. 12 is a front view showing portions of the first preferred embodiment of the present invention in use.
Figure 16:
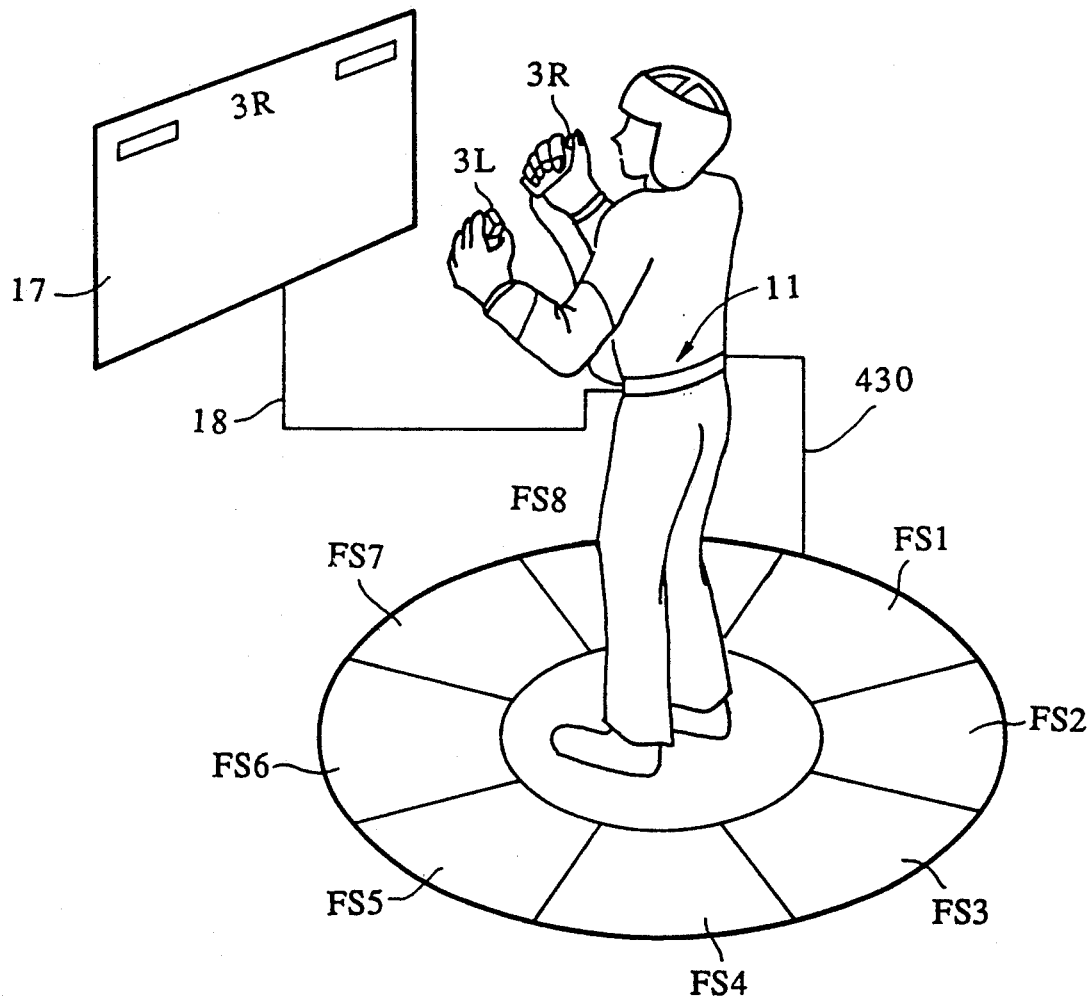
FIG. 16 is an oblique view showing the boxing simulator of the first preferred embodiment of the present invention in use.

First of all, as shown in FIG. 12, the belt on which image control apparatus central unit 11 is provided is strapped to the operator's waist. Then the left and right elbow sensors 2L, 2R are applied to the operator's left and right elbows, and the connectors 245L, 245R at the ends of their respective cables 244L, 244R are coupled with respective connectors 14L, 14R provided on image control apparatus central unit 11. Furthermore, the connectors 340L, 340R at the ends of cables 330L, 330R extending from left and right hand grip input devices 3L, 3R respectively, are coupled with their respective connectors 15L, 15R provided on image control apparatus central unit 11. As shown in FIG. 16, the connector 440 at the end of the cable 430 extending from the foot action input mat 4 is coupled with its respective connector 16 provided on image control apparatus central unit 11. Lastly, the output connector of image control apparatus central unit 11 is connected with display device 17 via cable 18.

Figure 15:
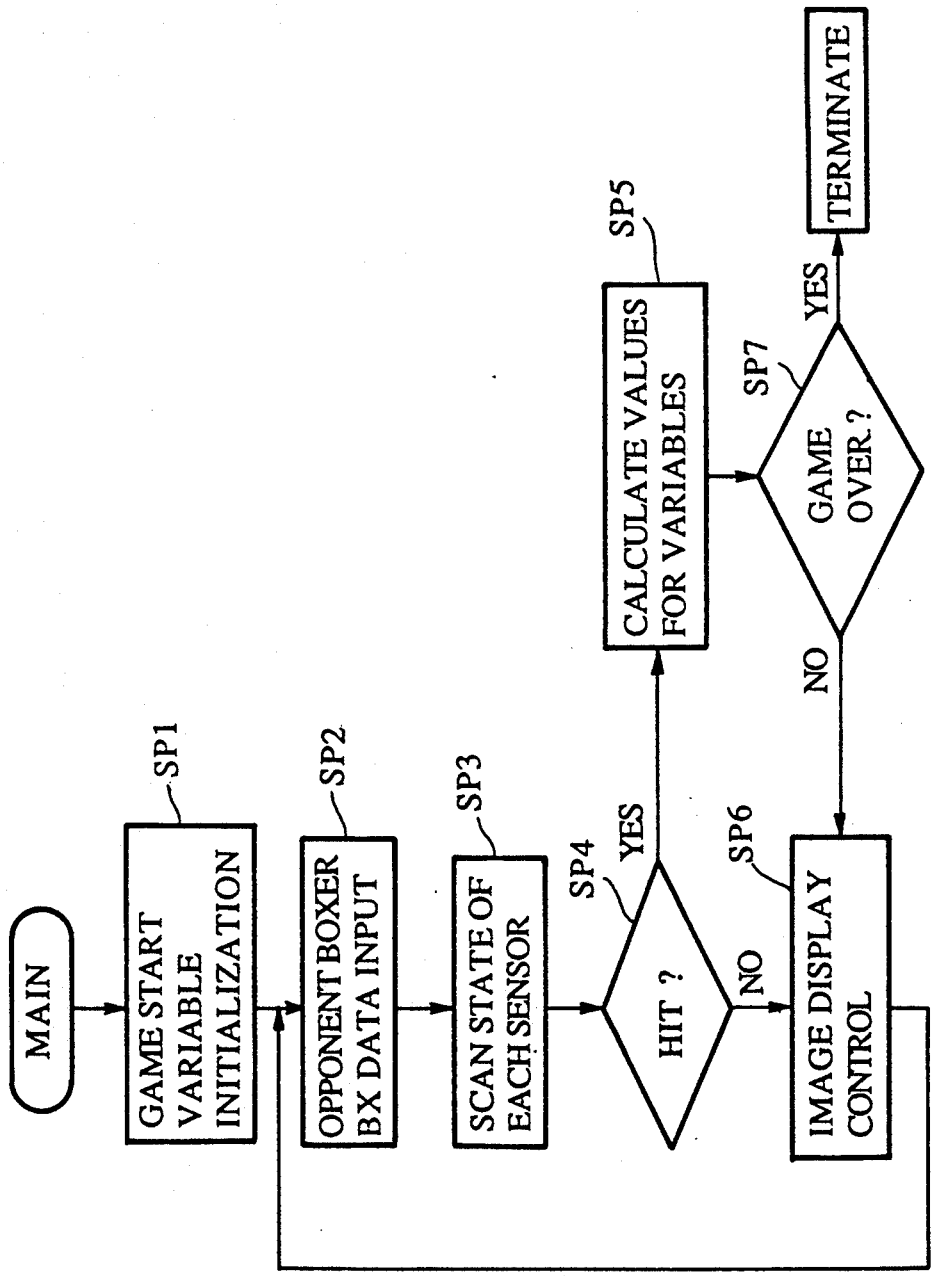
FIG. 15 is a flow chart showing the operation routine employed in the first preferred embodiment of the present invention.

At this point, the image control apparatus central unit 11 applied to the operator's waist, and display device 17 are powered. Then, CPU 1 initiates the operation process routine shown in FIG. 15, which will be described below.

SP1-Initialization

First of all, in step SP1, CPU 1 sets point table TB2, operator's feet position data area, opponent boxer's feet position data area, distance data area, extended arm length data area, extended arm length table, and power data area in RAM 8, where respective initialization data (OP, DP, ($X_1$, $Y_1$), ($X_2$, $Y_2$), ($X_2$-$X_1$, $Y_2$-$Y_1$), ($LX_1$, $LY_1$), ($LX_{2(n)}$, $LY_{2(n)}$), $PW_1$, $PW_2$) are loaded. In the present example, the operator's as well as the opponent boxer's BX power data areas are both initialized at 100 points. The offensive points OP and defensive points DP are initialized as shown in FIG. 14.

SP2-Load Opponent Boxer's Data

Next, when the operator pushes the commence boxing match button among the push button switches 12 on control unit 5, CPU 1 proceeds step SP2, where the aggression level for the opponent boxer BX is read out from the opponent's data area. The above mentioned aggression level is selected based on the operator's position, offensive posture, defensive posture, remaining power (described below), and other factors.

At this point, the operator is standing on mat 4M, facing his/her opponent boxer BX who is shown in the display frame DF on the display device 17 in response to an image control signal IS sent from CPU 1. The operator's position and movement are detected and output from left and right elbow sensors 2L, 2R, and foot action input mat 4, and similarly, the action of the operator's fingers and thumbs on pressure sensors SL1 -SL7, SR1 -SR7 of left and right hand grip input devices 2L, 2R are detected and output, the respective signals then being sent to multiplexer 9 after processing in elbow sensor interface 2a, hand grip input device input device interface 3a, and foot action input mat interface 4a respectively, as previously described. By this means, the challenge presented by the operator to the opponent boxer BX in the display frame DF is registered

SP3-Scan Operators Movement State

After the image of the opponent boxer BX is displayed in the display frame DF on the display device 17 in response to the image control signal IS sent from CPU 1, CPU 1 proceeds step SP3. In step SP3, a successively changing channel selector CS signal is supplied to multiplexer 9, by which means the delayed angle data $<\theta \text{old}>$, angle data $<\theta>$, key on signal KON, as well as the switch on signal SON are scanned and read into CPU 1 at high speed. The delayed angle data $<\theta \text{old}>$, angle data $<\theta>$, key on signal KON, switch on signal SON thus read into CPU 1 are then transmitted to the appropriate data areas in RAM 8. The sub-routines involved will be described in detail below.

(a) resetting operator's position data ($X_1$, $Y_1$)

When a switch on signal SON is received by the operator's feet position data area, the position data ($X_1$, $Y_1$) contained there is reset as will be explained below. As an example, when the operator steps on the front foot switch FS7, $Y_1$ of ($X_1$, $Y_1$) is incremented by one. If the operator again steps on front foot switch FS7, $Y_1$ is again incremented by one. When the operator steps on the left foot switch FS5, $X_1$ is decremented by one. If the operator steps on the left rear foot switch FS4, both $X_1$ and $Y_1$ are decremented by one.

(b) resetting opponent boxer's position data ($X_2$, $Y_2$)

Corresponding with foot movement by the operator, the opponent boxer BX moves as will be described below.

(i) foot work factor calculation

First of all, CPU 1 reads the opponent's foot work data (movement ability) from the opponent's data area in ROM 7 and distance data ($X_2$-$X_1$, $Y_2$-$Y_1$) from RAM 8. Then, based on the read out foot work (opponent boxer's BX movement ability) data and distance data ($X_2$-$X_1$, $Y_2$-$Y_1$), foot work factor FA is calculated. Foot work factor FA is a numerical term concerned with the opponent boxer's BX foot work. The foot work factor FA determined is different depending on whether the opponent boxer BX is maintaining an offensive posture or defensive posture. In the present example, in the case of an offensive advance, to the extent that the two combatants approach each other, that is, to the extent that the distance data ($X_2X_1$, $Y_2Y_1$) becomes small movement become smaller. Conversely, in the case of a defensive retreat, to the extent that the two combatants approach each other, increments of rearward movement become greater. In accordance with the above, in the case of a defensive retreat for example, to the extent that the two combatants approach each other, foot work factor FA becomes large. The calculation of the above mentioned increments of forward and rearward movement will be described in the following.

(ii) opponent boxer's BX foot movement increment calculation

Next, CPU 1 calculates the opponent boxer's BX foot movement increment ($\Delta X_2$, $\Delta Y_2$) according to Equ. 1 and Equ. 2 below.

$$\Delta X_2 = \alpha(X_1 - X_2) \cdot FA \qquad \text{(Equ. 1)}$$

$$\Delta Y_2 = \alpha(Y_1 - Y_2) \cdot FA \qquad \text{(Equ. 2)}$$

In the above equations, $\alpha$ equals $+1$ or $-1$, the appropriate value chosen depending on the position relationship between the operator and the opponent boxer BX. Thus when the opponent boxer BX moves toward or away from the operator, the X and Y coordinates are chosen so as to either increase or decrease. Further, depending on the skill level of the opponent boxer BX, the magnitude of the values for $\Delta X_2$ and $\Delta Y_2$ vary, and accordingly, the amount of increase or decrease of the X and Y coordinates varies.

(iii) opponent boxer's BX position calculation

After CPU 1 calculates the opponent boxer's BX foot movement increment ($\Delta X_2$, $\Delta Y_2$), the values stored in the opponent boxer's feet position data area ($X_2$, $Y_2$) in RAM 8 are read out, to which the calculated opponent boxer's BX foot movement increment values ($\Delta X_2$, $\Delta Y_2$) are added. The results of the above addition ($X_2 + \Delta X_2$, $Y_2 + \Delta Y_2$) are then written to the opponent boxer's feet position data area in RAM 8 as new position data ($X_2$, $Y_2$).

SP4-Strike Assessment

After completion of the above described step SP3, CPU 1 proceeds to step SP4 in which strike assessment is carried out as will be described below.

As referred to above, strike assessment is a determination of whether a strike delivered by the operator to the opponent boxer BX, or alternately, whether a strike delivered by the opponent boxer BX to the operator was an effective blow or not.

(a) offensive action by operator

In the case where a judgement is to be made whether a strike delivered by the operator to the opponent boxer BX was an effective strike or not, the determination is carried out with consideration of the operator's effective arm length as stored in the extended arm length data area as well as the distance separating the operator and opponent boxer BX. When the operator's effective arm length is greater than the distance separating the operator and opponent boxer BX, a strike is considered to have occured. Conversely, when the operator's effective arm length is less than the distance separating the operator and opponent boxer BX, a strike is considered not to have occured. In the following section, the calculations involved in the above described determination will be concretely explained.

(i) operator's arm length data calculation

First of all, angle data $<\theta>$ is read in from the angle data area in RAM 8, after which based on the angle data $<\theta>$, the length of the operator's arm at the time of aggressive action, that is, arm length data ($LX_1$, $LY_1$) is calculated. For the above mentioned arm length data calculation, arm length data ($LX_1$, $LY_1$) may be determined as a linear function of the angle data $<\theta>$. The values for arm length data ($LX_1$, $LY_1$) may also be determined by employing a table correlating angle data $<\theta>$ with arm length data ($LX_1$, $LY_1$).

For the calculation of arm length data ($LX_1$, $LY_1$), as is the case for the distance data ($X_2$-$X_1$, $Y_2$-$Y_1$) as will be described below, the ratio of the X component to the Y component is determined in order to obtain a vector value. Thus a vector value can be determined representing the effective length of the operator's arm as well as the distance separating the two combatants. In other words, the values obtained are vectors representing the magnitude of the respective distances which can be readily compared. The obtained vector value representing arm length data ($LX_1$, $LY_1$) is then stored in the arm length data area in RAM 8.

(ii) operator's arm position calculation

Next, CPU 1 adds the operator's arm length data ($LX_1$, $LY_1$) and operator's feet position ($X_1$, $Y_1$) to obtain the operator's arm position ($KOX_1$, $KOY_1$) data as shown in Equ. 3 and Equ. 4 below.

$$KOX_1 = X_1 + LX_1 \qquad \text{Equ. 3}$$

$$KOY_1 = Y_1 + LY_1 \qquad \text{Equ. 4}$$

(iii) strike assessment calculation

After CPU 1 calculates the operator's arm position ($KOX_1$, $KOY_1$) data, the operator's arm position ($KOX_1$, $KOY_1$) data is compared with the opponent boxer's feet position data ($X_2$, $Y_2$) stored in RAM 8 in the opponent boxer's feet position data area. In the case that the result of the above described comparison is in accordance with Equ. 5 and Equ. 6 below, an effective strike is judged to have occured.

$$X_2 = KOX_1 \qquad \text{Equ. 5}$$

$$Y_2 = KOY_1 \qquad \text{Equ. 6}$$

On the other hand, when the result of the above described comparison is not in accordance with Equ. 5 and Equ. 6, an effective strike is judged not to have occured.

For the above described strike assessment calculation, it is also possible to make the determination based on a region surrounding the opponent boxer's feet position ($X_2$, $Y_2$), rather than as a discreet point. For example, the determination can be carried out based on Equ. 7 and Equ. 8 below, so that when the conditions of Equ. 7 and Equ. 8 are true, an effective strike is judged to have occured.

$$X_2 - \Delta R \leq KOX_1 \leq X_2 + \Delta R \qquad \text{Equ. 7}$$

$$Y_2 - \Delta R \leq KOY_1 \leq Y_2 + \Delta R \qquad \text{Equ. 8}$$

Here, $\Delta R$ is a tolerance value for the opponent boxer's feet position data ($X_2$, $Y_2$), such that $2\Delta R$ is the amount of permissible variation of $X_2$ and/or $Y_2$.

(b) offensive action by the opponent boxer BX

In the case where a judgement is to be made whether a strike delivered by the opponent boxer BX to the operator was an effective strike or not, the determination is carried out with consideration of the opponent's effective arm length as stored in the extended arm length table as well as the distance separating the operator and opponent boxer BX. When the opponent's effective arm length is greater than the distance separating the operator and opponent boxer BX, a strike is considered to have occured. Conversely, when the opponent's effective arm length is less than the distance separating the operator and opponent boxer BX, a strike is considered not to have occured. In the following section, the calculations involved in the above described determination will be concretely explained.

(i) opponent's arm length data calculation

First of all, the effective length and direction of the opponent's arm for the purpose of an offense, that is, arm length data ($LX_2(n)$, $LY_2(n)$) is determined by CPU 1 according to the routine to be described below. That is based on known factors concerning the opponent and combat conditions (offense or defence, distance from operator, etc.), from steps SP2 and SP3, the effective opponent's arm length data ($LX_2(n)$, $LY_2(n)$) is determined. This effective opponent's arm length data ($LX_2(n)$, $LY_2(n)$) is determined by calculating the component of the vector representation of the opponent's arm length which is parallel to the vector representation of distance data ($X_2$-$X_1$, $Y_2$-$Y_1$).

For each combat condition, whether the opponent boxer BX begins on the offensive or the defensive is dependant not only on the combat condition, but also on the characteristics of the opponent boxer BX as stored in and selected from the opponent data area in ROM 7.

(ii) opponent's arm position calculation

Next, CPU 1 adds the effective opponent's arm length data ($LX_2(n)$, $LY_2(n)$) and opponent's feet position ($X_2$, $Y_2$) to obtain the opponent's arm position ($KOX_2$, $KOY_2$) data as shown in Equ. 9 and Equ. 10 below.

$$KOX_2 = X_2 + LX_2(n) \qquad \text{Equ. 9}$$

$$KOY_2 = Y_2 + LY_2(n) \qquad \text{Equ. 10}$$

(iii) strike assessment calculation

After CPU 1 calculates the opponent's arm position ($KOX_2$, $KOY_2$) data, the effective opponent's arm position ($KOX_1$, $KOY_1$) data is compared with the operator's feet position data ($X_1$, $Y_1$) stored in RAM 8 in the operator's boxer's feet position data area. In the case that the result of the above described comparison is in accordance with both Equ. 11 and Equ. 12 below, an effective strike is judged to have occured.

$$X_1 = KOX_2 \qquad \text{Equ. 11}$$

$$Y_1 = KOY_2 \qquad \text{Equ. 12}$$

On the other hand, when the result of the above described comparison is not in accordance with Equ. 11 or Equ. 12, an effective strike is judged not to have occured.

For the above described strike assessment calculation, it is also possible to make the determination based on a region surrounding the operators's feet position data ($X_2$, $Y_2$) analagous to the method shown in Equ. 7 and Equ. 8 above.

(c) strike assessment result

When the result of the strike assessment is [NO], CPU 1 proceeds to step SP6 where an image control process to be described below is carried out. On the other hand, when the result of the strike assessment is [YES], CPU 1 proceeds to step SP5.

SP5-Calculation of Variable Data Values

When the result of the strike assessment is [YES] in step SP4, that is, when a hit has been judged to have occured, CPU 1 proceeds to step SP5 where various variable values are calculated as will be described below.

(a) speed value calculation

First of all, CPU 1 calculates the speed value SP (integer value) of the operator's punch. In the case of an offensive move by the operator, the speed value SP is determined based on the difference ($\theta - \theta\text{old}$) between angle data $<\theta>$ and delayed angle data $<\theta\text{old}>$. Accordingly, when the operators's punch is rapid, speed value SP is large, and when the operators's punch is slow, speed value SP is small. The speed value SP for the opponent boxer's BX punches is determined by CPU 1 based on values stored in ROM 7 in the opponent's data area, on timing of the opponent boxer's BX attack, as well as on conditions selected by the operator.

(b) punch power calculation

Next, from type of punch delivered, punch speed, as well as the opponents defense state, CPU 1 calculates the punch power PUN using Equ. 13 below.

$$PUN = ((OP * SP) - DP) \qquad \text{Equ. 13}$$

In Equ. 13, OP is offensive points and DP is defensive points (refer to the offensive/defensive type distribution table TB2 in FIG. 14). When the speed SP and defensive points DP are constant, the punch power PUN is such that the right hook is more powerful than the right jab, and the right upper is more powerful than the right hook, and the right upper is more powerful than the left upper. Similarly, when the speed SP and offensive points OP are constant, the punch power PUN is less when countered with left or right ducking or sway than when countered with left or right blocking (refer to type table TB1 in FIG. 13 and offensive/defensive point distribution table TB2 in FIG. 14). Furthermore, to the extent that speed SP is high, the punch power PUN is great.

For example, when the operator makes contact with a left straight, if the opponent boxer BX presents a block defence, from the point distribution table TB2 in RAM 8 (FIG. 14), offensive points OP=10 and defensive points DP=5 are read out. Then, based on angle data $<\theta>$ and delayed angle data $<\theta\text{old}>$, for example when speed SP=3 has been calculated, punch power PUN=25 is calculated by Equ. 13. In the case where speed SP is small and defensive points DP are high, the punch power PUN calculated by Equ. 13 would be a negative value. However, because a negative value for punch power PUN is not meaningful, all such negative values are set to zero.

(b) remaining power calculation

Next, CPU 1 reads out the operator's power PW1 and the power PW2 of the opponent boxer BX from the power data area in RAM 8, and according to Equ. 14 and Equ. 15 below, calculates the remaining power for the operator and for the opponent boxer BX.

$$ZAN1 = PW1 - PUN \qquad \text{Equ. 14}$$

$$ZAN2 = PW2 - PUN \qquad \text{Equ. 15}$$

In the above equations, ZAN1 is the remaining power for the operator and ZAN2 is the remaining power for the opponent boxer BX. When CPU 1 completes the calculations for remaining power ZAN1, ZAN2, the values obtained are stored in RAM 8 as new values for the operator's power PW1 and opponent's power PW2 respectively.

SP7-Determination of Completion of Game

After the above described calculations for remaining power ZAN1, ZAN2 are completed in step SP6, CPU 1 proceeds to step SP7 in which it is determined whether the game has finished or not, that is, whether there is a winner or not. In other words, it is determined whether the operator's remaining power ZAN1, or the remaining power ZAN2 of the opponent boxer BX is zero or less.

(a) remaining power ZAN1 or remaining power ZAN2 is zero or less (end of match)

In the case where either the remaining power ZAN1 of the operator is zero or less, the opponent boxer BX is judged to have won the match. Similarly, when the remaining power ZAN2 of the opponent boxer BX is zero or less, the operator is judged to have won the match. In either case, display device 17 shows an image denoting the end of the match, after which CPU 1 completes processing for the game.

(b) remaining power ZAN1 and remaining power ZAN2 are both greater than zero (continue match)

In the case where neither the remaining power ZAN1 of the operator or the remaining power ZAN2 of the opponent boxer BX is zero or less, CPU 1 proceeds to step SP6 and display device 17 shows an image denoting continuation of the match.

SP6-Image Display Control

In step SP4, when no hit was judged to have occurred, and when in step SP7, the match has not been judged to be completed, CPU 1 proceeds to step SP6 in which the control of an image displayed in accordance with the movement of the operator and that of the opponent boxer BX is carried out.

(a) image display

Figure 17:
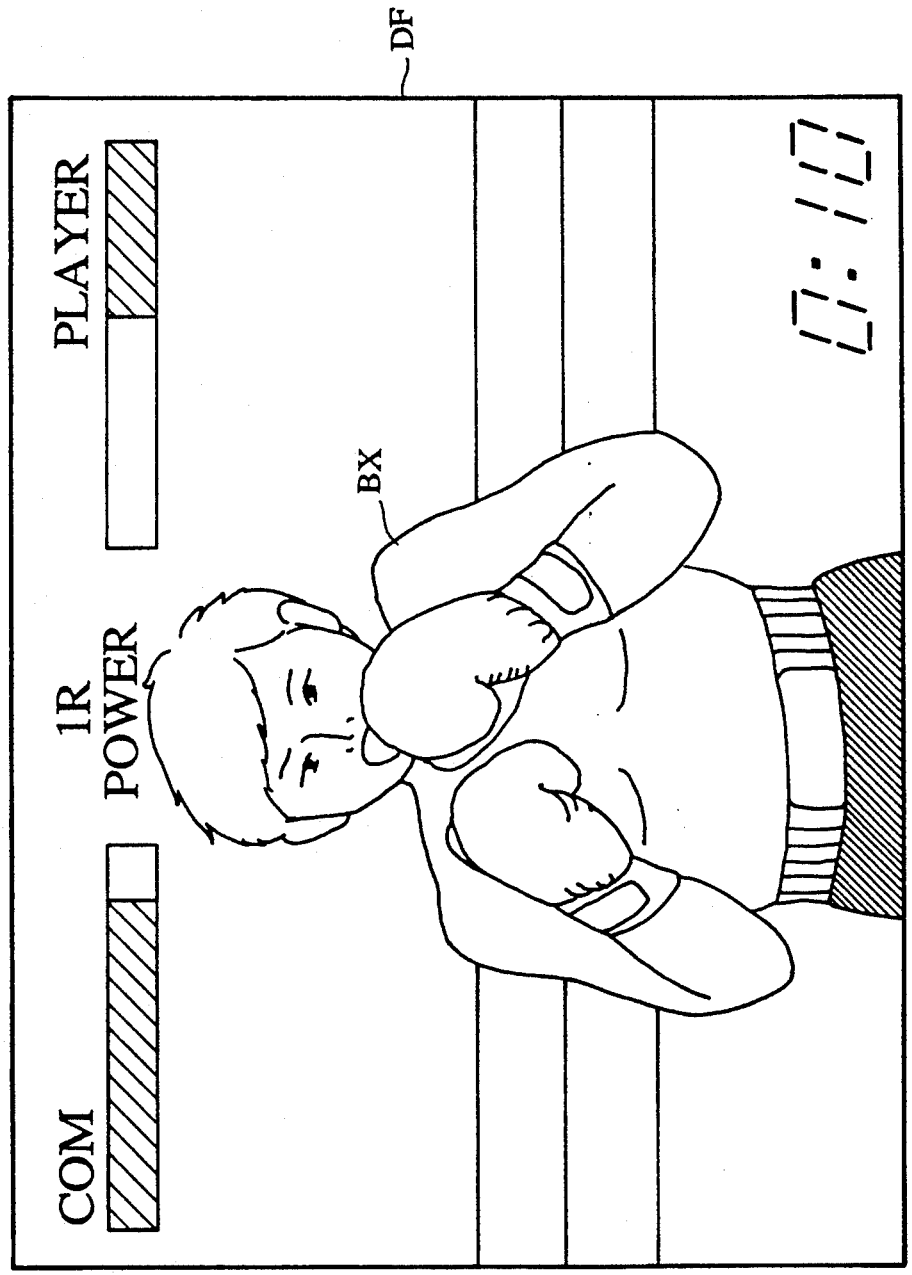
FIGS. 17 and 18 are examples of video displays from the first preferred embodiment of the present invention.
Figure 18:
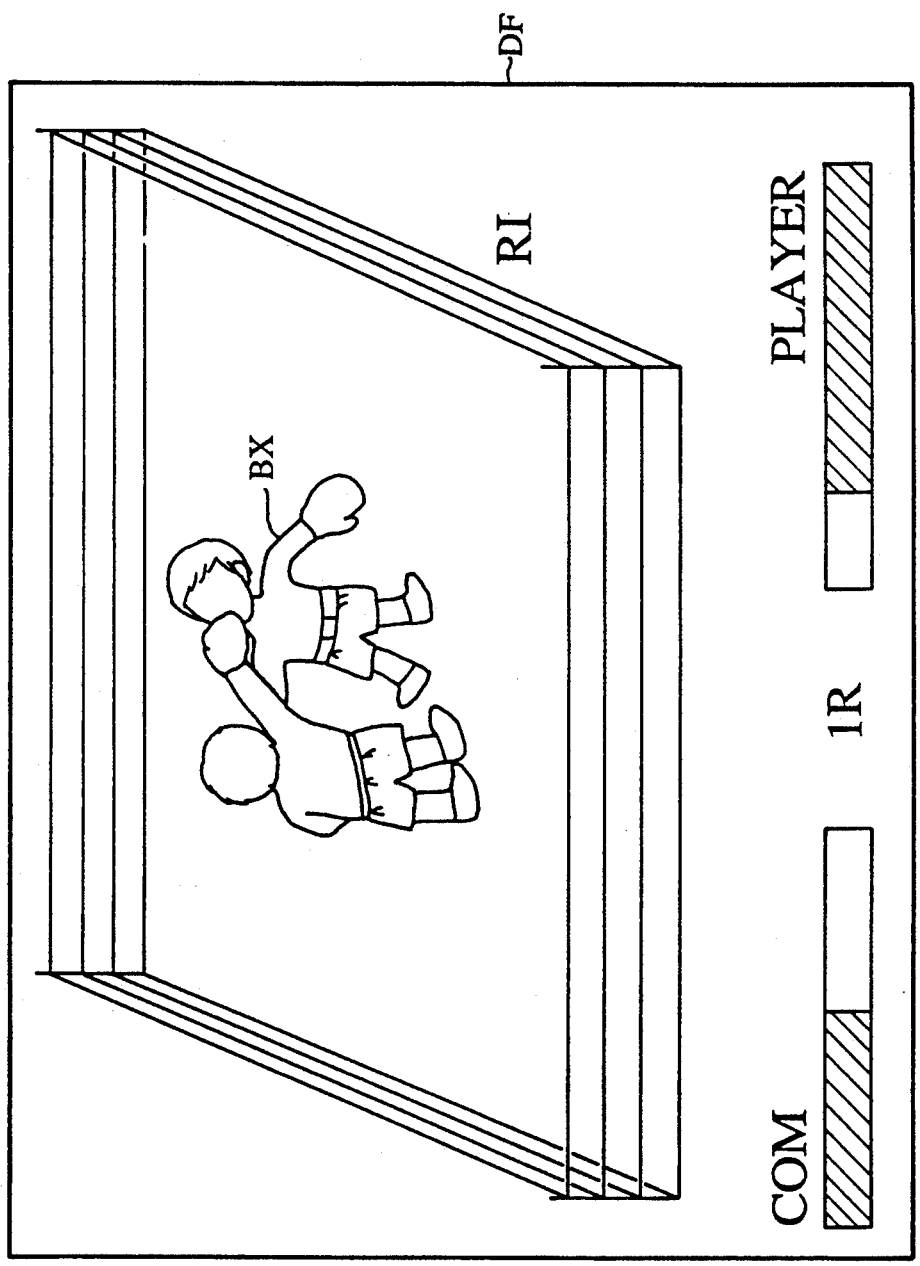

Based on the operator's and opponent boxer's BX offensive/defensive type, punch power and speed, arm length, distance separating the combatants and other position data (steps SP2-SP5), CPU 1 causes the most suitable image to be displayed on display device 17 (FIGS. 17, 18). That is, based on the above mentioned various types of data, CPU 1 reads out image selection data from the image selection data area in ROM 7. Then, according to the read out image selection data, the object image data is read out from video memory 6, on which basis an image control signal is formed which is then sent to display device 17 via bus 10. Based on the supplied image control signal, display device 17 displays a scene appropriate for the real time circumstances of the boxing match. In this way, while carrying out steps SP4 through SP6, for example, the agility of the opponent boxer's foot work can be displayed, and similarly, while proceeding from step SP7 to step SP6, for example, a scene can be displayed depicting the opponent boxer BX receiving a blow to the face from the operator (refer to FIG. 18). Similarly, when the operator receives a punch from the opponent boxer BX, the screen will momentarily flash, and at the same time, an appropriate vocalization will be produced. In the case of a knock-out punch received by the operator, the screen becomes jet black. In the display frame DF on display device 17, remaining power of the operator and opponent boxer, ZAN1 and ZAN2, are shown in the background. Thus, by viewing this power gauge, the operator can better observe the circumstances of the match, including the details of the game end victory or defeat (FIG. 17).

(b) distance data reset

CPU 1 reads out the respective position data $(X_1, Y_1)$, $(X_2, Y_2)$ from the operator's feet position data area and opponent boxer's feet position data area, calculates the distance between the combatants $(X_2-X_1, Y_2-Y_1)$, and using the calculated value, resets the distance data area.

After the above described step, CPU 1 returns to step SP2, and repeats the process described in the above sections. In other words, based on the operators position and defensive/offensive action, the appropriate response action for the opponent boxer BX is read out from the opponents data area.

With the present invention, while watching the display frame DF, the operator responds with his fingers, arms, and legs, whereby corresponding signals (angle data $<\theta>$, delayed angle data $<\theta old>$, key on signal KON, switch on signal SON) are generated in step SP2 and sent to CPU 1 in step SP3.

With the apparatus as described above, an image of the opponent boxer BX can be generated accurately and at high speed in real time. Also, it is easy for the operator to accurately respond to the moves of the opponent boxer BX. In this way, the reality of the simulation is increased. Moreover, due to the fact that the apparatus of the present invention is directly controllable by various parts of the operator's anatomy, the present invention is also applicable to training devices, exercise devices, and the like.

With the present invention as thus described in the present preferred embodiment, a foot action input mat 4 employing 8 foot switches FS1-FS8 is described. However, is also possible to employ a foot action input mat employing 4 foot switches FS1-FS4, as shown in FIG. 7, that is, a foot work input mat with foot switch FSa1 indicating right motion, foot switch FSa2 indicating rearward motion, foot switch FSa3 indicating left motion, and foot switch FSa4 indicating forward motion.

Similarly, the present invention as described in the present preferred embodiment is in the form of a boxing simulator, however, the present invention is in no way so limited, and is thus applicable to many other types of simulations and games, as well as to training devices, exercise devices, and the like.

What is claimed is:

1. An image control apparatus for controlling an image displayed on a display device, comprising:
   movement detection means for detecting a movement of an operator and for generating a movement signal corresponding to said movement of the operator, said movement detection means being adapted to be attached to a portion of the body of said operator adjacent to a joint and detecting continuously the bending angle of the joint;
   judgement means for judging a state of said operator based on said movement signal; and
   controlling means for controlling said image in accordance with the judging result of said judging means and preceding image information displayed on said display device,
   whereby said image is varied in response to said movement of said operator.

2. An image control apparatus according to claim 1 wherein said movement detection means detects the velocity of said movement of said operator.

3. An image control apparatus according to claim 1 wherein said operator's body portion is an elbow.

4. An image control apparatus according to claim 1 wherein said movement detection means further comprises means, adapted to be grasped by the hand of said operator, for detecting movement of said hand.

5. An image control apparatus according to claim 1 wherein said movement detection means further comprises means for detecting foot movement of said operator.

6. An image control apparatus according to claim 1 further comprising storing means for storing various image data representing various situations in accordance with a state of said operator.

7. An image control apparatus according to claim 6 wherein said controlling means selects an image datum from said various image data stored in said storing means.

8. An image control apparatus according to claim 1 wherein said movement detection means detects the velocity of movement of said operator and the position of said body portion, and wherein said judgment means judges said state of said operator based on a combination of said velocity and said position.

9. An image control apparatus according to claim 1 wherein said image which is varied in response to movement of said operator includes images not corresponding to said operator.

10. An video game controller for controlling a video game displayed on a display device, said video game controller comprising:
    a plurality of attachments adapted to be attached to a plurality of body portions of an operator adjacent plural joints of the operator:
    movement detection means for continuously detecting angular movements of said joints of said operator based on displacements of said attachments;
    control signal generating means for generating control signals in accordance with movements detected by said movement detection means; and
    means for controlling said video game displayed on the display device in response to said control signals.

* * * * *